United States Patent [19]

Balter

[11] 4,210,220

[45] Jul. 1, 1980

[54] AXLE ASSEMBLY

[75] Inventor: Jack S. Balter, Troy, Mich.

[73] Assignee: Rockwell International Corporation, Pittsburgh, Pa.

[21] Appl. No.: 961,330

[22] Filed: Nov. 16, 1978

Related U.S. Application Data

[63] Continuation of Ser. No. 789,748, Apr. 21, 1977, abandoned, which is a continuation of Ser. No. 679,433, Apr. 22, 1976, abandoned.

[51] Int. Cl.² ............... B60K 23/00; F16J 15/10
[52] U.S. Cl. ............... 180/70 R; 308/187.1; 277/167.3
[58] Field of Search .......... 308/187.1, 211, 210; 301/1, 124 R, 124 H, 126, 105, 111, 114–117, 108 R, 108 A, 108 S, 108 TW, 6 R; 277/105, 117, 168, 167.3; 180/75, 88, 70 R; 188/72.4

[56] References Cited

U.S. PATENT DOCUMENTS

| | | | |
|---|---|---|---|
| 2,076,218 | 4/1937 | Alden | 308/187.1 |
| 2,639,204 | 5/1953 | Terry | 308/187.1 |
| 3,048,241 | 8/1962 | Kelley et al. | 188/72.4 |
| 3,113,810 | 12/1963 | Brusca | 308/187.1 |
| 3,114,579 | 12/1963 | Isenbarger | 301/108 TW |

*Primary Examiner*—H. Grant Skaggs

[57] ABSTRACT

An axle assembly having an axle shaft rotatably mounted within a housing and operably connected to a driving device at one end thereof, the axle shaft having an annular head formed on its end opposite the driving device, fastening element to fasten the head to a hub, the hub being rotatably mounted on the outer surface of the housing and rotatably driven by the axle shaft, the improvement comprising the annular head having formed thereon an annular lip disposed inwardly of the central bore of the hub, an annular groove provided on the outer surface of the annular lip to accept an "O" ring sealing member, the "O" ring sealing member forming a seal between the head and the hub.

1 Claim, 2 Drawing Figures

AXLE ASSEMBLY

This is a continuation of application Ser. No. 789,748, filed Apr. 21, 1977, now abandoned which is a continuation of Ser. No. 679,433 filed Apr. 22, 1976, abandoned.

BACKGROUND OF THE INVENTION

This invention relates generally to axle assemblies and, more particularly, to the fastening of the axle shaft to the hub of a drive axle assembly.

Drive axle assemblies become more and more complex due to the greater and greater load demands placed on them. To keep pace with the ever increasing performance demands on drive axles, improvements have been made in the various lubricants for the various operational parts of the drive axle. One area of criticality is the roller bearings which rotatably support the driven hubs located at the ends of the drive axle assembly. These roller bearings see tremendous loads, including severe mechanical shock loading. Loss of lubrication to these roller bearings could result in substantial damage to the drive axle assembly and could also result in a serious accident should the driver lose control of the vehicle due to a seized wheel bearing. The lubricant for the roller bearings is typically contained within a lubricant reservoir disposed at the ends of the axle assemblies. Another area of criticality is the differential mechanism which splits the power of the drive train to the various drive wheels associated with the vehicle. As with the wheel bearings, the differential mechanisms are exposed to greater and greater operational loading and, therefore, its parts must be continuously and effectively lubricated. The lubricant reservoir for both of these operational mechanisms is defined by an inner seal typically between the wheel hub and the axle housing and a seal between the wheel hub and the axle shaft head. With respect to the latter seal, the prior art included a paper gasket or other similar gasket between the axle head and the hub. Additionally, the prior art included certain forms of dowels and the like to further secure the axle shaft to the hub and increase the pressure exerted on the gasket therebetween. However, because of the inherent resiliency or give of the paper gasket or the like, certain relative movement is encountered between the axle head and the axle shaft of the hub. This relative movement results in a seal breakdown and deterioration of the studs (and/or tapered dowels) fastening the axle shaft head to the hub resulting ultimately in the failure of the seal and, more importantly, of the fastening studs which could cause the loss of the wheel.

SUMMARY OF THE INVENTION

It is therefore a primary object of the present invention to provide an axle assembly in which the head of the axle shaft is secured directly to the hub without any intervening gasket or the like, a sealing means provided between an extension of the axle head and the hub to seal the lubricant within the reservoir.

It is another important object of the present invention to provide an axle assembly having an axle shaft rotatably mounted within a housing and operably connected to a drive means at one end thereof, the axle shaft having an annular head formed on its end opposite the drive means, fastening means to fasten the head to a hub, the hub being rotatably mounted on the outer surface of the housing and rotatably driven by the axle shaft, the improvement comprising the annular head having formed thereon an annular lip disposed inwardly of the central bore of the hub, an annular groove provided on the outer surface of the annular lip to accept an "O" ring sealing member, the "O" ring sealing member forming a seal between the head and the hub.

It is yet another important object of the present invention to provide an axle assembly wherein the head is fastened directly to said hub and the fastening means comprise a series of threaded studs threadably fastened to the hub and in registration with a plurality of holes in the head and self-locking nuts and a threaded self-locking nut disposed on each of the threaded studs to capture and fasten the head at the hub.

It is a further object of the present invention to provide an axle assembly wherein said annular lip extends longitudinally within the central bore of the hub and the annular lip is formed integrally with the head.

It is yet a further object of the present invention to provide an axle assembly wherein there is one "O" ring sealing member engaging a beveled portion provided at the end of the central bore of the hub.

It is still another object of the present invention to provide an axle assembly wherein there is one annular groove to accept one "O" ring sealing member, a portion of the outer surface of the annular lip being cylindrical in shape having an outer diameter slightly less than the inner diameter of the central bore of the hub.

It is yet another object of the present invention to provide an axle assembly having an axle shaft rotatably mounted within a housing and operably connected to a drive means at one end thereof, the axle shaft having an annular head formed on its end opposite the drive means, fastening means to fasten the head to a hub, the hub being rotatably mounted on the outer surface of the housing and rotatably driven by the axle shaft, the improvement comprising the annular head having formed thereon an annular lip disposed inwardly of the central bore of the hub, an annular groove provided on the inner surface of the central bore of the hub to accept an "O" ring sealing member, the "O" ring sealing member forming a seal between the head and the hub.

It is another object of the present invention to provide an axle shaft having an annular lip formed on one end thereof and a plurality of splines formed at the other end of the axle shaft, the head having an annular lip formed on the radially extending face of the head facing toward the opposite end of the axle shaft.

It is also another object of the present invention to provide an axle assembly which is provided with an effective sealing means which is simplistic in design and effective in service over a protracted period of time.

It is yet another object of the present invention to provide an axle assembly having an "O" ring seal provided between the head of the axle shaft and the hub which is easy to replace and maintain.

Other objects of the present invention and details of the structure of the sealing means between the axle head and hub will appear more fully from the following description and the accompanying drawings.

DESCRIPTION OF THE DRAWINGS

The accompanying drawings, referred to herein and constituting a part hereof, illustrate an embodiment of the invention and, together with the description, serve to explain the principles of the invention.

In the drawings.

DESCRIPTION OF THE PREFERRED EMBODIMENT

Figure 1:
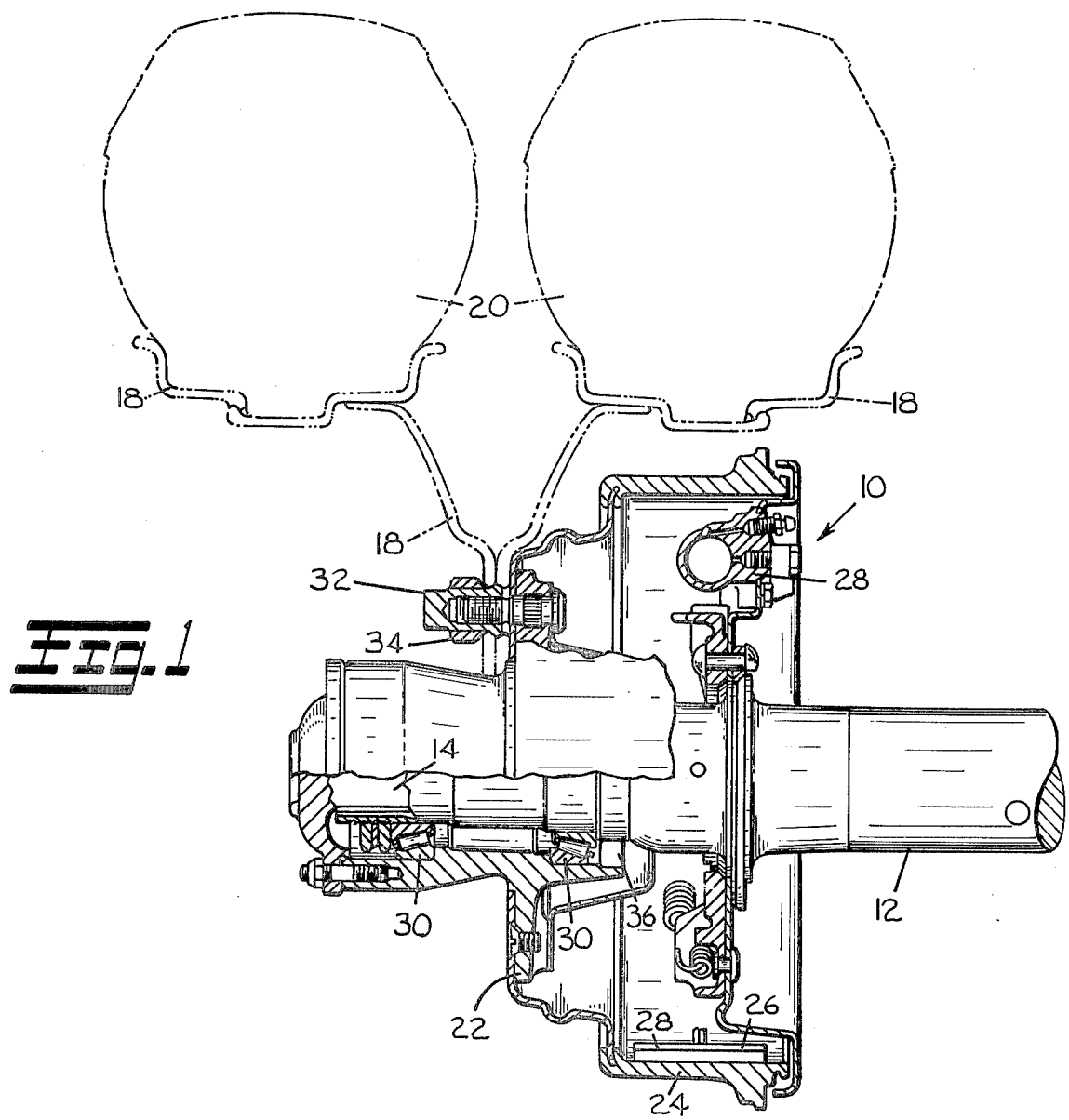
FIG. 1 is a partial sectional view in elevation with certain parts partially cut away showing an axle assembly embodying the present invention.
Figure 2:
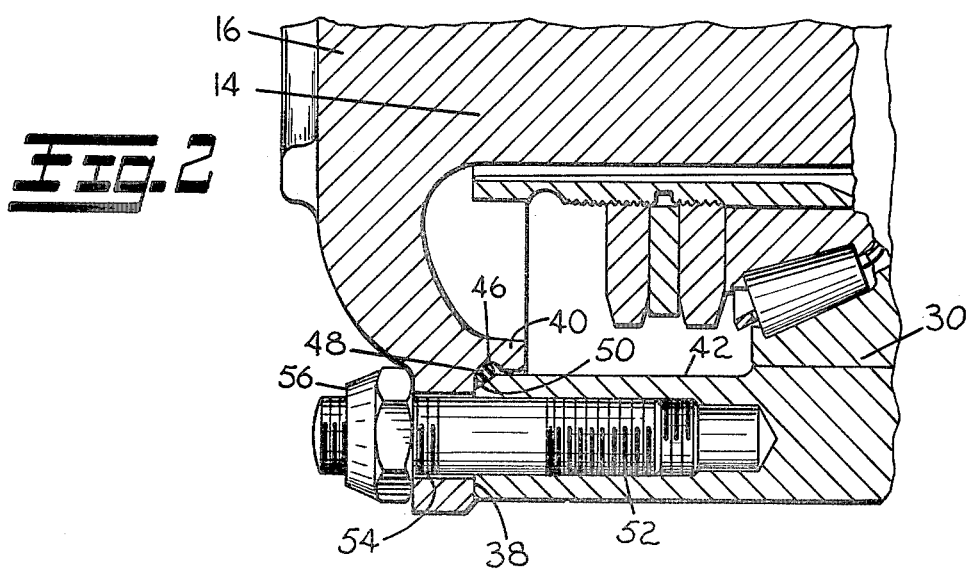
FIG. 2 is an enlarged partial sectional view of a portion of the axle assembly of FIG. 1 showing the axle head fastened to the hub.

Referring now to the drawings and, in particular, FIGS. 1 and 2, there is shown a portion of an axle assembly 10 embodying the present invention. More particularly, FIG. 1 shows the wheel end of a drive axle assembly. The drive axle 10 that is generally depicted in FIG. 1 is, with the exception of the invention to be described below, well-known in the prior art, as, for example, Rockwell International's G, H, L, R and U series of drive axles. In that regard, it is to be noted that the specific configuration of the various operational parts of the drive axle, as, for example, brakes, bearings and wheels, may be changed but the present invention would still be applicable and particularly useful in any such changed configuration.

The axle assembly 10 includes an axle housing 12 which encloses certain operational parts of the axle assembly, as, for example, the differential (not shown) and the axle shaft 14. The axle shaft may be of the type with certain exceptions as manufactured by Rockwell International and referred to as the "TORSION FLOW AXLE SHAFT". These axle shafts are noted for their strength and long life in operation. The axle shaft 14 is typically splined at one end to be accepted within the splined bore of a side gear of the differential to be driven thereby. The axle shaft 14 is provided with an axle shaft head 16 at the end opposite its splined end. The axle shaft 14 is the mechanism which transmits the power from the differential to the wheels at the end of the axle assembly.

The axle 10 is provided with a rim 18 which has two tires 20 mounted thereon. The rim is fixedly attached to rotate with a hub 22. The hub 22 may be of composite structure and includes a drum 24 whose inner surface is acted upon by a brake mechanism 26 to brake the vehicle with which the axle assembly is operably associated. The brakes 26 have a number of operational parts well-known in the art, as, for example, its pressure actuation cylinder 28 which exerts a force to the brake shoes 28' which engage the above-noted inner surface of the drum 24 of the hub 22. The hub 22 is rotatably mounted on the axle housing 12 at two roller bearings 30. The roller bearings 30 are typically referred to as wheel bearings and as noted above provide the rolling support for the hub 22 and the rim 18 and tires 20 all fixedly attached thereto to rotate therewith. The typical means of fastening the rim 18 to the hub 22 is by a plurality of studs 32 which are received in a plurality of holes in the rim and held in place by threaded nuts 34 threaded on each of the studs 32.

It can be seen that the two roller bearings 30 are supported at their inner races on the outer surface of the axle housing 12. The roller bearings 30 are positioned equidistant from the rim 18 to provide generally equal support therefor. The outer races of the roller bearings 30 support the inner surface of the hub 22. The roller bearings 30 are in need of constant lubrication for, as noted above, they experience significant operational loading and are critical to the proper functioning of the entire hub assembly. The roller bearings 30 typically share the same lubricant with the differential in a common lubricant reservoir. The reservoir or area which surrounds the roller bearings 30 and is in communication with the differential, therefore, must be suitably sealed to contain the lubricant. Accordingly, a roller seal 36 is provided adjacent to the roller bearing 30 inboard of the rim 18. The seal 36 may be of a variety and types which are generally commercially available. The thrust of the present invention is to be found at the end of the reservoir outboard of the rim, that is, the sealing juncture of the axle shaft head 30 with respect to the hub 22. This particular feature is best shown in FIG. 2 which is an enlargement of an area of FIG. 1. In FIG. 2 it can be seen that the axle shaft head 16 is in intimate contact with the radially extending face 38 of the hub 22. It can also be seen that the axle shaft head 26 is provided with a longitudinally extending annular lip 40 which is disposed within the central bore 42 of the hub 22. The annular lip 40 may be formed integrally with the axle shaft head 16 and the outer surface of said annular lip 40 has a diameter slightly less than the inside diameter of the central bore 42 of the hub 22. The outer surface of the longitudinally extending annular rib 40 has a cylindrical portion which terminates in an annular groove 46. The annular groove 46 is adapted to receive an "O" ring sealing member 48. Further, the inner surface of the central bore 42 of the hub 22 terminates in an annular bevel 50 and the "O" ring sealing member 48 seals the hub 22 with respect to the axle shaft head 16 at the bevel 50 and the annular groove 46. That is, the "O" ring sealing member 48 is captured and trapped between the hub 22 and the axle shaft head 16 at the bevel 50 and the annular groove 46, respectively. The "O" ring sealing member 48, as can be seen in FIG. 2, is formed into a substantially elliptical shape to be in intimate contact with the annular groove 46 and the bevel 50. As before mentioned, the axle shaft transmits the power received from the power train of the vehicle to the differential to the hub 22 which in turn is transmitted to the rim 18 and ultimately to the tires 20. The power is passed through the axle shaft head 16 through a plurality of studs 52 and thence to the hub 22. The plurality of studs 52 are received within a plurality of bores 54 in the axle shaft head 16 and a self-locking nut 56 secures the axle shaft head 16 in place on said hub 22.

There is thus provided an effective sealing arrangement between the hub 22 and the axle shaft head 16 which in no way detracts from the operational integrity of the mechanical bond effected by the studs 52 and the self-locking nuts 56. The elimination of the prior art paper gasket ensures that the axle shaft heat 16 is in metal-to-metal contact with the radially extending face of the hub 22. Testing of this arrangement has indicated that the life of the studs and, therefore, the integrity of the fastening of the axle shaft head 16 to the hub 22 is increased significantly.

Obviously, the present invention is not limited to the specific details as hereinabove described but is capable of other modifications and changes without departing from the spirit and the scope of the appended claims.

What is claimed is:

1. A drive axle assembly for vehicles having an axle shaft rotatably mounted within a housing, said axle shaft having an annular head formed on its end, fastening means to fasten said head to a hub, said hub being rotatably mounted on the outer surface of said housing and rotatably driven by said axle shaft, the improvement comprising said hub having a central bore having a cylindrical inner wall, having a radially extending face at an outer end of said hub and having an annular beveled portion between said wall and said face, said annular head having formed thereon a cylindrical annular lip disposed inwardly and projecting into the central bore of said hub, a radially extending portion of said head having a radially extending face facing in the same direction as the annular lip projects, the annular lip having a cylindrical outer surface spaced inward from said cylindrical inner wall of said hub, an annular groove provided in the axial outer end of the outer surface of said annular lip between the cylindrical outer surface and the radially extending face to accept an "O" ring sealing member, said fastening means comprise a series of threaded studs threadedly fastened in an end of said hub and extending outward from said radially extending face of said hub and in registration with a plurality of holes in said radially extending portion of said head and a locking nut threadedly disposed on each of said threaded studs to capture and fasten said head at said hub and to hold said faces in metal-to-metal contact, said annular lip extending longitudinally within and in spaced relation to said central bore of said hub and said annular lip being integral with said head, there being one "O" ring sealing member engaging said annular beveled portion provided at the end of said central bore of said hub inward of said threaded studs, said sealing member disposed in said annular groove, said "O" ring sealing member intimately contacting said beveled portion and said annular groove and captured thereby, said "O" ring sealing member in its captured substantially elliptical cross sectional form with a wedge-shaped outer portion between said radially extending wall of said annular head and said annular beveled portion of said hub and with a rounded portion extending inward in said annular groove filling substantially the entire volume of said annular groove and forming a liquid seal between said annular groove and said hub and said head, the portion of the outer surface of said annular lip being cylindrical in shape and having an outer diameter slightly less than the inner diameter of the central bore of said hub, such that lubricant stored in a reservoir formed at the end of the axle assembly within the central bore of the hub which lubricates bearings between the axle shaft and housing may flow through a passage formed between the outer surface of the annular lip and the central bore of the hub, whereby lubricant if under increased pressure would tend to push the round portion of the "O" ring and thereby push the "O" ring toward its wedge shaped outer portion between the radially extending wall of the axle head and the beveled portion of the hub.

* * * * *

UNITED STATES PATENT AND TRADEMARK OFFICE
CERTIFICATE OF CORRECTION

PATENT NO. : 4,210,220
DATED : July 1, 1980
INVENTOR(S) : John S. Balter

It is certified that error appears in the above-identified patent and that said Letters Patent are hereby corrected as shown below:

Column 4, Line 51, after "shaft" delete 'heat' and insert --head--.

Signed and Sealed this

Eleventh Day of November 1980

[SEAL]

Attest:

SIDNEY A. DIAMOND

Attesting Officer

Commissioner of Patents and Trademarks